US010536438B2

(12) United States Patent
Chowdhury et al.

(10) Patent No.: US 10,536,438 B2
(45) Date of Patent: Jan. 14, 2020

(54) SECURE PROVISION OF INPUTS TO A DISPLAY TRANSMITTER DEVICE

(71) Applicant: Intel Corporation, Santa Clara, CA (US)

(72) Inventors: Rajneesh Chowdhury, Portland, OR (US); Karthik Veeramani, Hillsboro, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 15/474,488

(22) Filed: Mar. 30, 2017

(65) Prior Publication Data
US 2018/0288010 A1  Oct. 4, 2018

(51) Int. Cl.
| H04L 29/06 | (2006.01) |
| H04W 12/06 | (2009.01) |
| H04W 84/12 | (2009.01) |
| G06F 3/0484 | (2013.01) |

(52) U.S. Cl.
CPC ......... *H04L 63/0428* (2013.01); *H04W 12/06* (2013.01); *G06F 3/0484* (2013.01); *H04W 84/12* (2013.01)

(58) Field of Classification Search
USPC ........................................................ 713/168
See application file for complete search history.

(56) References Cited

U.S. PATENT DOCUMENTS

| 10,032,431 B2 * | 7/2018 | Wilde .................. G06F 13/382 |
| 2013/0179605 A1 | 7/2013 | Huang et al. |
| 2014/0129827 A1 | 5/2014 | Khosravi et al. |
| 2016/0027399 A1 * | 1/2016 | Wilde .................. G06F 13/382 |
| | | 345/520 |
| 2017/0185540 A1 | 6/2017 | Poornachandran et al. |

FOREIGN PATENT DOCUMENTS

WO  WO2017/1122881 A1  6/2017

OTHER PUBLICATIONS

Extended European Search Report dated Jul. 26, 2018 for European Patent Application No. 18160606.2, 12 pages.
(Continued)

*Primary Examiner* — William S Powers
*Assistant Examiner* — Aubrey H Wyszynski
(74) *Attorney, Agent, or Firm* — Schwabe, Williamson & Wyatt, P.C.

(57) ABSTRACT

Embodiments include apparatuses, methods, and systems including a wireless display system with a secure back channel to transmit an input from an input device coupled to a display receiver device to a display transmitter device. An input from an input device may be captured by a display receiver device in a secure execution environment. Furthermore, the captured input may be transmitted through a back channel to a display transmitter device in a secured form based on one or more secure parameters negotiated with the display transmitter device. The display transmitter device may receive the input in the secured form, decrypt the input in the secured form based on the one or more secure parameters to obtain the input, and further supply the input to an operating system or an application to operate on the display transmitter device. Other embodiments may also be described and claimed.

25 Claims, 8 Drawing Sheets

(56) References Cited

OTHER PUBLICATIONS

Jaco Du Toit et al., "A Model for Secure Mobile Computing", Jul. 28-30, 2015, 10 pages, Science and Information Conference 2015.
Yacob W. Sitorus et al., "Establishment of Wi-Fi Display Session between Source and Sink Device in Wireless Android Screencasting", Nov. 9-12, 2015, 6 pages, 2015 International Symposium of Intelligent Signal Processing and Communication Systems (ISPACS).
Office Action dated Jun. 3, 2019 for European Patent Application No. 18160606.2, 4 pages.

* cited by examiner

SECURE PROVISION OF INPUTS TO A DISPLAY TRANSMITTER DEVICE

FIELD

Embodiments of the present invention relate generally to the technical field of computing, and more particularly to wireless display systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A wireless display system may enable a display transmitter device to provide display content, e.g., multimedia display content such as music, movies, photos, videos, and applications, through a forward channel of a wireless display protocol to a display receiver device, so that the display receiver device may mirror the display content on the display transmitter device. An input device may be coupled to the display receiver device, where an input from the input device may be captured by the display receiver device and transmitted to the display transmitter device to control the operations of the display transmitter device. The input may be transmitted through a back channel of the wireless display protocol, e.g., a user input back channel (UIBC), from the display receiver device to the display transmitter device.

However, currently, the wireless display protocol provides no or insufficient security for the provision of input from the display receiver device to the display transmitter device. An input from an input device coupled to the display receiver device transmitted through the unsecured back channel may be vulnerable to potential secure risks. For example, the display transmitter device may receive the input in good faith from the display receiver device, without verifying that the input is from a valid or trusted source. As a result, sensitive applications, such as banking, health, etc., running on the display transmitter device may be compromised with malicious inputs from a bad display receiver device. Furthermore, sensitive user inputs, e.g. banking identification information, password, etc., may be intercepted in the display receiver device. Malicious denial of service (DOS) attack may be launched to the display transmitter device by continuously sending inputs without actual user interactions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
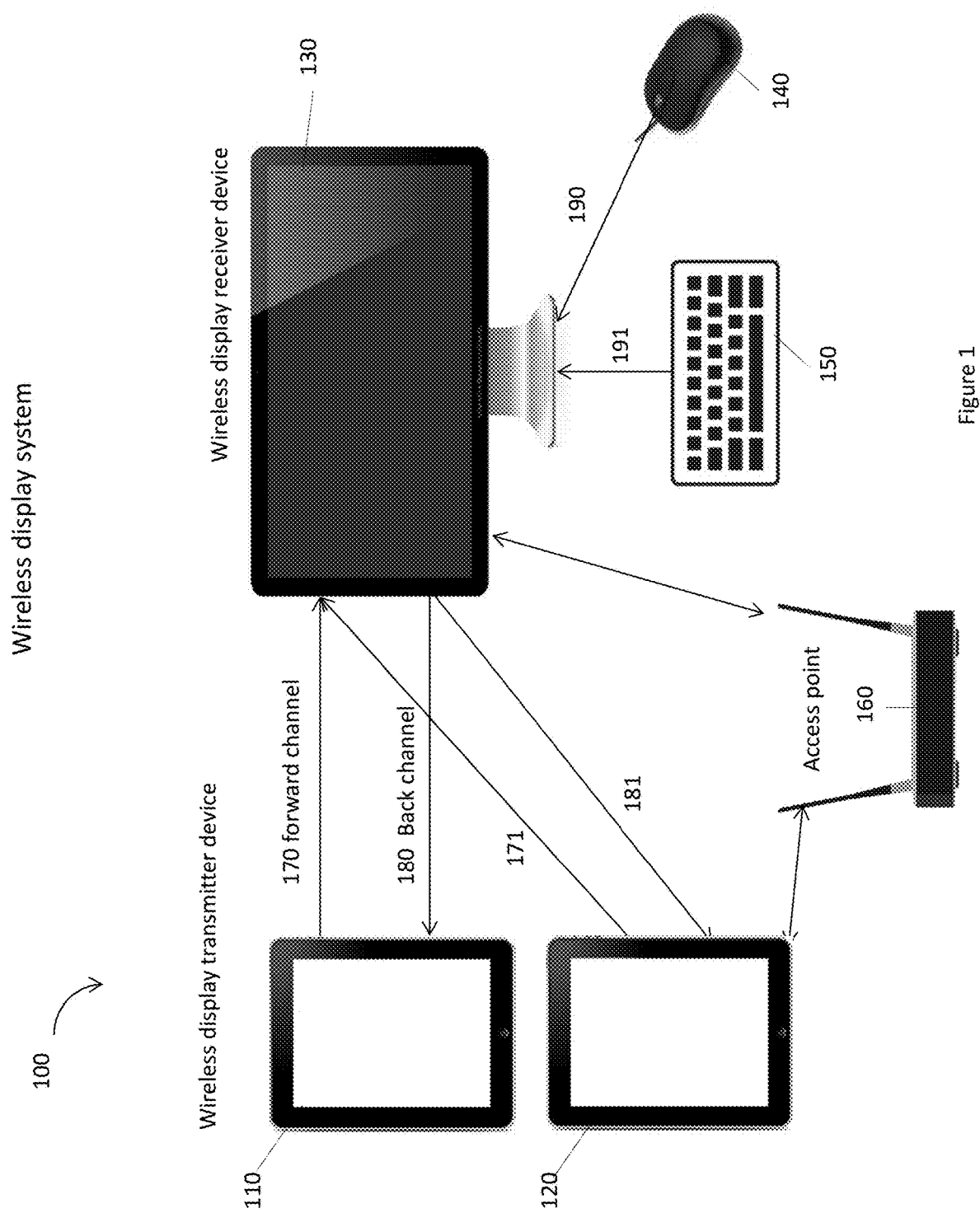
FIG. 1 illustrates an example wireless display system including multiple display transmitter devices communicating with a display receiver device and input devices coupled to the display receiver device, in accordance with various embodiments.

A wireless display system may enable a display transmitter device to provide display content through a forward channel to a display receiver device. In addition, an input from an input device coupled to a display receiver device may be captured by the display receiver device and transmitted through a back channel to the display transmitter device to control the operations of the display transmitter device. A secure back channel from the display receiver device to the display transmitter device may prevent many potential security risks for transmitting an input captured by the display receiver device to the display transmitter device.

In embodiments, an input from an input device coupled to a display receiver device may be captured by the display receiver device in a secure execution environment. Furthermore, the captured input may be transmitted through a back channel to a display transmitter device in a secured form based on one or more secure parameters negotiated with the display transmitter device. The display transmitter device may receive the input in the secured form, decrypt the input in the secured form based on the one or more secure parameters to obtain the input, and further supply the input to an operating system or an application to operate on the display transmitter device. Additionally, the display transmitter device may transmit display content, e.g., multimedia display content, to the display receiver device through a forward channel.

In embodiments, a display transmitter device may be presented for wireless provision of display content to a display receiver device. The display transmitter device may comprise a secure execution environment. A display communication interface manager within the secure execution environment may communicate to the display receiver device, via a wireless display protocol, a capability for secure communication to receive an input from an input device coupled to the display receiver device. The display communication interface manager may determine that the display receiver device has a capability for secure communication to transmit the input from the input device coupled to the display receiver device. The display communication interface manager may further authenticate the display receiver device, and negotiate with the display receiver device one or more secure parameters for the secure communication of the input from the input device coupled to the display receiver device. The one or more secure parameters may be stored in the secure execution environment. In addition, the display communication interface manager may receive the input in a secured form from the display receiver device, wherein the input in the secured form may be secured based on the one or more secure parameters negotiated. The input may be used by the display receiver device to control the provision of the display content from the display transmitter device.

In embodiments, a display receiver device may be presented for wireless provision of display content from a display transmitter device. The display receiver device may comprise a secure execution environment. A display communication interface manager within the secure execution environment may communicate to the display transmitter device, via a wireless display protocol, a capability for secure communication to transmit an input from an input device coupled to the display receiver device. The display communication interface manager may further negotiate, with the display transmitter device, one or more secure parameters for the secure communication of the input from the input device coupled to the display receiver device. In addition, the display communication interface manager may capture the input from the input device coupled to the display receiver device, and transmit the input in a secured form, wherein the input in the secured form may be secured based on the one or more secure parameters negotiated. The input may be used by the display receiver device to control the provision of the display content from the display transmitter device.

In embodiments, a wireless display system may comprise a display transmitter device, a display receiver device, and an input device coupled to the display receiver device. The display transmitter device may communicate to the display receiver device, via a wireless display protocol, a capability for secure communication to receive an input from the input device. The display transmitter device may also authenticate the display receiver device, and negotiate with the display receiver device one or more secure parameters for the secure communication of the input from the input device. In addition, the display receiver device may negotiate with the display transmitter device the one or more secure parameters, and capture an input from the input device. The display receiver device may further transmit the input in a secured form to the display transmitter device, where the input in the secured form may be secured based on the one or more secure parameters negotiated.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example wireless display system 100 including multiple display transmitter devices, e.g., a display transmitter device 110, and a display transmitter device 120, communicating with a display receiver device, e.g., a display receiver device 130, and input devices, e.g., an input device 140, and an input device 150, coupled to the display receiver device, in accordance with various embodiments.

In embodiments, the wireless display system 100 may include one or more display transmitter devices communicating with one or more display receiver devices. The display transmitter device 110 and the display transmitter device 120 may be two of such example display transmitter devices. Similarly, the display receiver device 130 may be one of such example display receiver device. There may be multiple display receiver devices or display transmitter devices not shown in FIG. 1.

The display transmitter device 110 may transmit display content, e.g., multimedia display content such as music, movies, photos, videos, and applications, to the display receiver device 130 through a forward channel 170. In addition, the display transmitter device 110 may receive input or other information from the display receiver device 130 through a back channel 180, where the input or other information may be generated by the input device 140, or the input device 150 coupled to the display receiver device 130. The input may be used to control the provision of display contents from the display transmitter device 110. Similarly, the display transmitter device 120 may transmit display content to the display receiver device 130 through a forward channel 171. In addition, the display transmitter device 120 may receive input or other information from the display receiver device 130 through a back channel 181, where the input or other information may be generated by the input device 140, or the input device 150 coupled to the display receiver device 130. In embodiments, the display transmitter device 120 may further communicate with the display receiver device 130 through an access point 160. In embodiments, display transmitter devices 120 and 121 and display receiver device 130 are respectively provided with aspects of the secure input technology of the present disclosure, to enable inputs may be securely provided from display receiver device 130 to display transmitter devices 110 and 120, to be described more fully below.

Embodiments herein may be presented for the cases where the forward channel 170 from the display transmitter device 110 to the display receiver device 130, the forward channel 171 from the display transmitter device 120 to the display receiver device 130, the back channel 180 from the display receiver device 130 to the display transmitter device 110, and the back channel 181 from the display receiver device 130 to the display transmitter device 120 may be wireless channels based on wireless display protocols. In some other embodiments, the forward channel 170, the forward channel 171, the back channel 180, and the back channel 181 may include a wired cable. Still in some other embodiments, some of the forward channel 170, the forward channel 171, the back channel 180, and the back channel 181 may be wired cables and the rest may be wireless channels.

In embodiments, the forward channel 170, the forward channel 171, the back channel 180, and the back channel 181 may be based on some communication or computing protocols, e.g., wireless display protocols. The protocols for the forward channel 170, the forward channel 171, the back channel 180, and the back channel 181 may include a protocol stack containing protocols in various layers, e.g., protocols for a physical layer, a medium access layer, a network layer, and/or an application layer. For example, the protocols for the forward channel 170, the forward channel 171, the back channel 180, and the back channel 181 may be a wireless display protocol designed for communication between the display transmitter device 110, the display transmitter device 120, and the display receiver device 130. In embodiments, the wireless display protocols may be a selected one of a mobile industry processor interface display serial interface (MIPI-DSI) protocol, a Miracast protocol, or a wireless display (WiDi) protocol. In some embodiments, when wired cables are used as some of the forward channel 170, the forward channel 171, the back channel 180, and the back channel 181, other wired display protocols, e.g., a high-definition multimedia interface (HDMI) protocol, or a display port (DP) protocol, may be used as well.

In embodiments, the display transmitter device 110 or the display transmitter device 120 may be a computer or a computing device that offers information resources, services, and applications to the display receiver device 130. For example, the display transmitter device 110 or the display transmitter device 120 may be a wearable device, a smartphone, a computer tablet, a laptop, a game controller, a set-top box, an infotainment console, an Internet of Things (IoT) device, or others. In embodiments, the display receiver device 130 may include a display, which may be a selected one of a light-emitting diode (LED) display, a liquid crystal display (LCD), a thin film transistor liquid crystal display (TFT-LCD), a digital light processing (DLP) display, a plasma display, an electroluminescent panel, an organic light-emitting diode (OLED) display, or an electronic paper.

The display transmitter device 110 or the display transmitter device 120 may communicate with the display receiver device 130 using a client-server model of computing, where the display transmitter device 110 or the display transmitter device 120 may be a server. In some other embodiments, the display transmitter device 110 or the display transmitter device 120 and the display receiver device 130 may communicate using peer-to-peer model, when the display transmitter device 110 or the display transmitter device 120 and the display receiver device 130 share and consume resources in an equipotent manner. In embodiments, the display transmitter device 110 or the display transmitter device 120 may be a master device communicating with the display receiver device 130, where the display receiver device 130 may be a slave device.

In embodiments, the input device 140 or the input device 150 may be a selected one of a magnetometer, an accelerometer, a gyroscope, a pressure sensor, a humidity sensor, a proximity sensor, a position sensor, or a temperature sensor. In addition, the input device 140 or the input device 150 may be a keyboard, a cursor control device, a pointing stick, a trackball, a camera, a microphone, a touchscreen, a touchpad, or some other input devices.

In embodiments, the input device 140 may be coupled to the display receiver device 130 through a channel 190, and the input device 150 may be coupled to the display receiver device 130 through a channel 191. In embodiments, the input device 140 or the input device 150 may communicate with the display receiver device 130 based on a general purpose communication bus protocol for the channel 190 or the channel 191, such as a selected one of a serial peripheral interface (SPI) protocol, a scalable coherent interface (SCI) protocol, a small computer system interface (SCSI) protocol, a universal serial bus (USB) protocol, a peripheral component interconnect (PCI) protocol, or an inter-integrated circuit ($I^2C$) protocol. In some other embodiments, the input device 140 or the input device 150 may communicate with the display receiver device 130 based on a near field communication (NFC) protocol, a wireless personal area network (WPAN) protocol, a mobile body area networks (MBAN) protocol, an infrared protocol, a Bluetooth® protocol, a ZigBee protocol, a Z-Wave protocol, or others.

Figure 2:
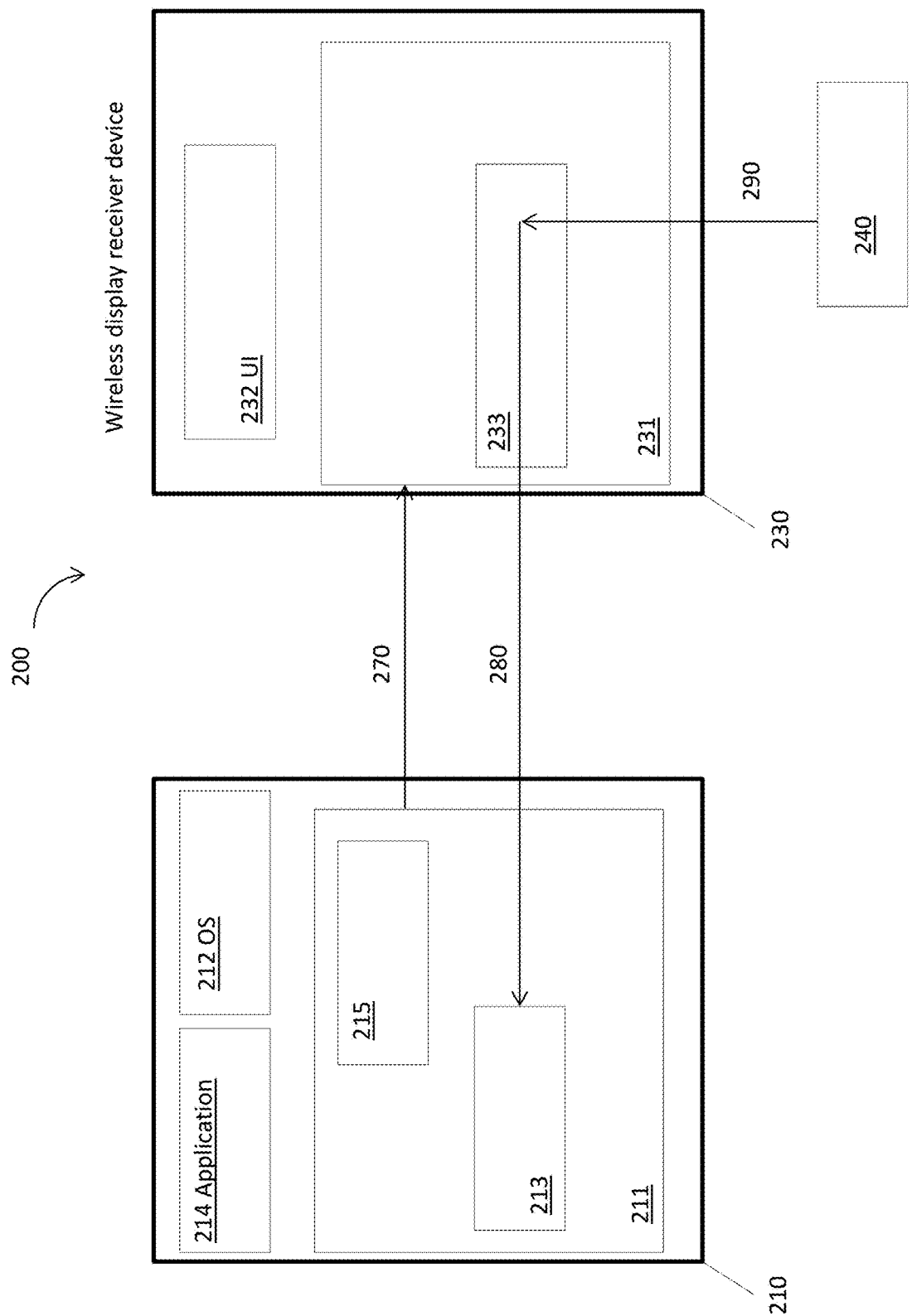
FIG. 2 illustrates another example wireless display system including a display transmitter device communicating with a display receiver device and an input device coupled to the display receiver device, in accordance with various embodiments.

FIG. 2 illustrates another example wireless display system 200 including a display transmitter device, e.g., a display transmitter device 210, communicating with a display receiver device, e.g., a display receiver device 230, and an input device, e.g., an input device 240, coupled to the display receiver device, in accordance with various embodiments. The system 200 may be an example of the system 100 shown in FIG. 1. For example, the display transmitter device 210 may be an example of the display transmitter device 110, while the display receiver device 230 and the input device 240 may be an example of the display receiver device 130 and the input device 140, respectively. Similar to display transmitter and receiver devices 110 and 130, display transmitter and receiver devices 210 and 230 may be incorporated with the secure input technology of the present disclosure. The wireless display system 200 may further include other devices, e.g., an access point, not shown for clarity.

In embodiments, the display transmitter device 210 may communicate with the display receiver device 230 through a forward channel 270 and a back channel 280, via a wireless display protocol, e.g, Miracast, described more fully below with references to FIG. 5. The input device 240 may communicate with the display receiver device 230 through a channel 290. The forward channel 270, the back channel 280, and the channel 290 may be similar to the forward channel 170, the back channel 180, and the channel 190 in FIG. 1. The forward channel 270 and the back channel 280 may be channels of the wireless display protocol, e.g, Miracast.

In embodiments, the display transmitter device 210 may include a secure execution environment 211, where the secure execution environment 211 may include a display communication interface manager 213, and a storage 215. Secure execution environment 211 may be implemented in hardware or software. An example of hardware implementation may include, but is not limited to the Management Engine technology of Intel Corporation. An example of software implementation may include, but is not limited to the Execution Enclave technology of Intel Corporation. Furthermore, the display transmitter device 210 may include an operating system 212, and an application 214, which, except for its ability to cooperate with secure execution environment 211, may be any one of a number of operating systems and applications known in the art. The operating system 212 may support the operations for the application 214. In addition, the display transmitter device 210 may include hardware components, e.g., one or more processors, so that the secure execution environment 211, the display communication interface manager 213, the operating system 212, and the application 214 may be operated by the one or more processors. In some other embodiments, the secure execution environment 211, the display communication interface manager 213 may be directly implemented in hardware circuits.

In embodiments, the display receiver device 230 may include a secure execution environment 231, where the secure execution environment 231 may include a display communication interface manager 233. Similarly, secure execution environment 231 may be implemented in hardware or software. An example of hardware implementation may include, but is not limited to the Management Engine technology of Intel Corporation. An example of software implementation may include, but is not limited to the Execution Enclave technology of Intel Corporation. The display receiver device 230 may further include a user interface (UI) 232, where display content from the display transmitter device 210 may be displayed on the UI 232.

In embodiments, the display communication interface manager 213 within the secure execution environment 211 may communicate to the display receiver device 230, through the forward channel 270 via a wireless display protocol, a capability for secure communication to receive an input from an input device coupled to the display receiver device. The display communication interface manager 213 may further determine that the display receiver device 230 has a capability for secure communication to transmit the input from the input device 240 coupled to the display receiver device 230. The display communication interface manager 213 may also authenticate the display receiver device 230. These negotiation and related aspects are described more fully below with references to FIG. 5.

In addition, the display communication interface manager 213 may negotiate with the display receiver device 230 one or more secure parameters for the secure communication of the input from the input device 240 coupled to the display receiver device 230. In embodiments, the one or more secure parameters may include a session key, an encryption algorithm, or a security protocol for transmitting the input in a secured form from the display receiver device 230 to the display transmitter device 210. The one or more secure parameters may be stored in the storage 215 within the secure execution environment 211. As noted earlier, these negotiation and related aspects are described more fully below with references to FIG. 5.

The display communication interface manager 213 may further receive the input in a secured form from the display receiver device 230, where the input in the secured form may be secured based on the one or more secure parameters negotiated. For example, as described more fully below in FIG. 5, the input in the secured form from the display receiver device 230 may be encrypted according to a negotiated high-bandwidth digital content protection (HDCP) protocol and sent by a user input back channel (UIBC). Afterwards, the display communication interface manager 213 may decrypt the input in the secured form based on the one or more secure parameters to obtain the input. The input may be used for the display receiver device 230 to control the provision of the display content from the display transmitter device 210. For example, the display communication interface manager 213 may supply the input to the operating system 212 or the application 214 to operate on the display transmitter device 210. In some embodiments, the application 214 may be a banking application or a game. Furthermore, the display communication interface manager 213 may manage and transmit multimedia display content to the display receiver device 230 through the forward channel 270.

In embodiments, the display communication interface manager 233 within the secure execution environment 231 may communicate to the display transmitter device 210, via a wireless display protocol, a capability for secure communication to transmit an input from the input device 240 to control the provision of the display content from the display transmitter device 210 (described more fully below with references to FIG. 6). In addition, the display communication interface manager 233 may negotiate, with the display transmitter device 210, one or more secure parameters for the secure communication of the input from the input device 240. The one or more secure parameters may include a session key, an encryption algorithm, or a security protocol for transmitting the input in the secured form from the display receiver device 230 to the display transmitter device 210.

The display communication interface manager 233 may capture the input from the input device 240, and transform the input into a secured form based on the one or more secure parameters negotiated. For example, as described more fully below in FIG. 6, the input in a secure form may be obtained by encrypted according to HDCP protocol. The display communication interface manager 233 may further transmit the input in the secured form to the display transmitter device 210, based on the one or more secure parameters negotiated. For example, the input in the secured form may be sent by a user input back channel (UIBC). Furthermore, the display communication interface manager 233 may receive a multimedia display content from the display transmitter device 230, where the multimedia display content may be generated based on the input transmitted by the display communication interface manager 233.

Figure 3:
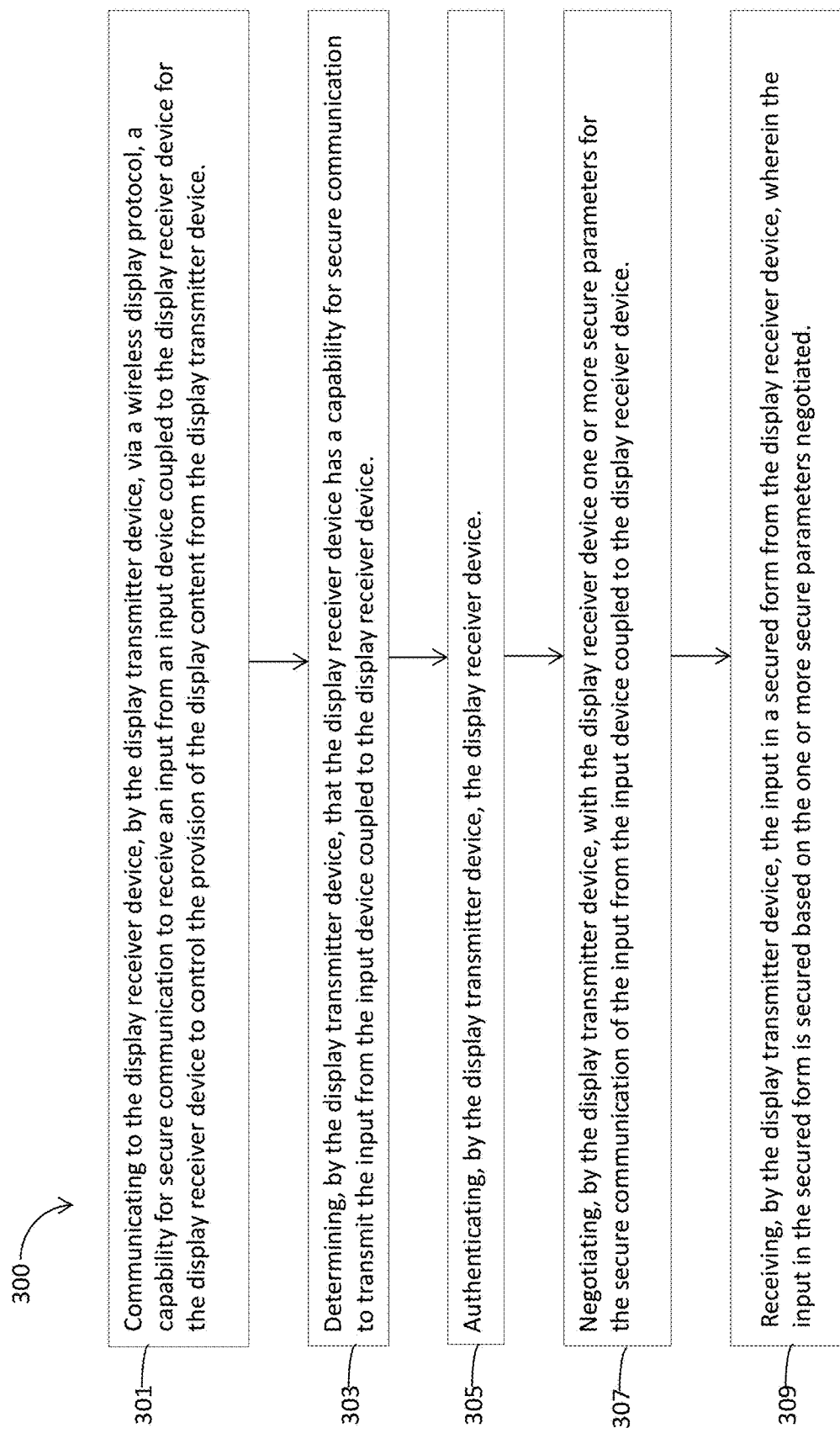
FIG. 3 illustrates an example process for a display transmitter device to receive an input from an input device coupled to a display receiver device through a secure back channel, in accordance with various embodiments.

FIG. 3 illustrates an example process 300 for a display transmitter device to receive an input from an input device coupled to a display receiver device through a secure back channel, in accordance with various embodiments. In embodiments, the process 300 may be a process performed by the display transmitter device 110 in FIG. 1, or the display transmitter device 210 in FIG. 2, and performed by the display communication interface manager 213.

The process 300 may start at an interaction 301. During the interaction 301, the display transmitter device may communicate to a display receiver device, via a wireless display protocol, a capability for secure communication to receive an input from an input device coupled to the display receiver device for the display receiver device to control the provision of the display content from the display transmitter device, as described more fully below in FIG. 5. For example, at the interaction 301, the display transmitter device 210 may communicate to the display receiver device 230, via a wireless display protocol, a capability for secure communication to receive an input from the input device 240 coupled to the display receiver device 230.

During an interaction 303, the display transmitter device may determine that the display receiver device has a capability for secure communication to transmit the input from the input device coupled to the display receiver device, as described more fully below in FIG. 5. For example, at the interaction 303, the display transmitter device 210 may determine that the display receiver device 230 has a capability for secure communication to transmit the input from the input device 240 coupled to the display receiver device 230.

During an interaction 305, the display transmitter device may authenticate the display receiver device. For example, at the interaction 305, the display transmitter device 210 may authenticate the display receiver device 230.

During an interaction 307, the display transmitter device may negotiate with the display receiver device one or more secure parameters for the secure communication of the input from the input device coupled to the display receiver device, as described more fully below in FIG. 5. For example, at the interaction 307, the display transmitter device 210 may negotiate with the display receiver device 230 one or more secure parameters for the secure communication of the input from the input device 240 coupled to the display receiver device 230.

During an interaction 309, the display transmitter device may receive the input in a secured form from the display receiver device, wherein the input in the secured form may be secured based on the one or more secure parameters negotiated, as described more fully below in FIG. 5. For example, at the interaction 309, the display transmitter device 210 may receive the input in a secured form from the display receiver device 230, wherein the input in the secured form may be secured based on the one or more secure parameters negotiated.

Figure 4:
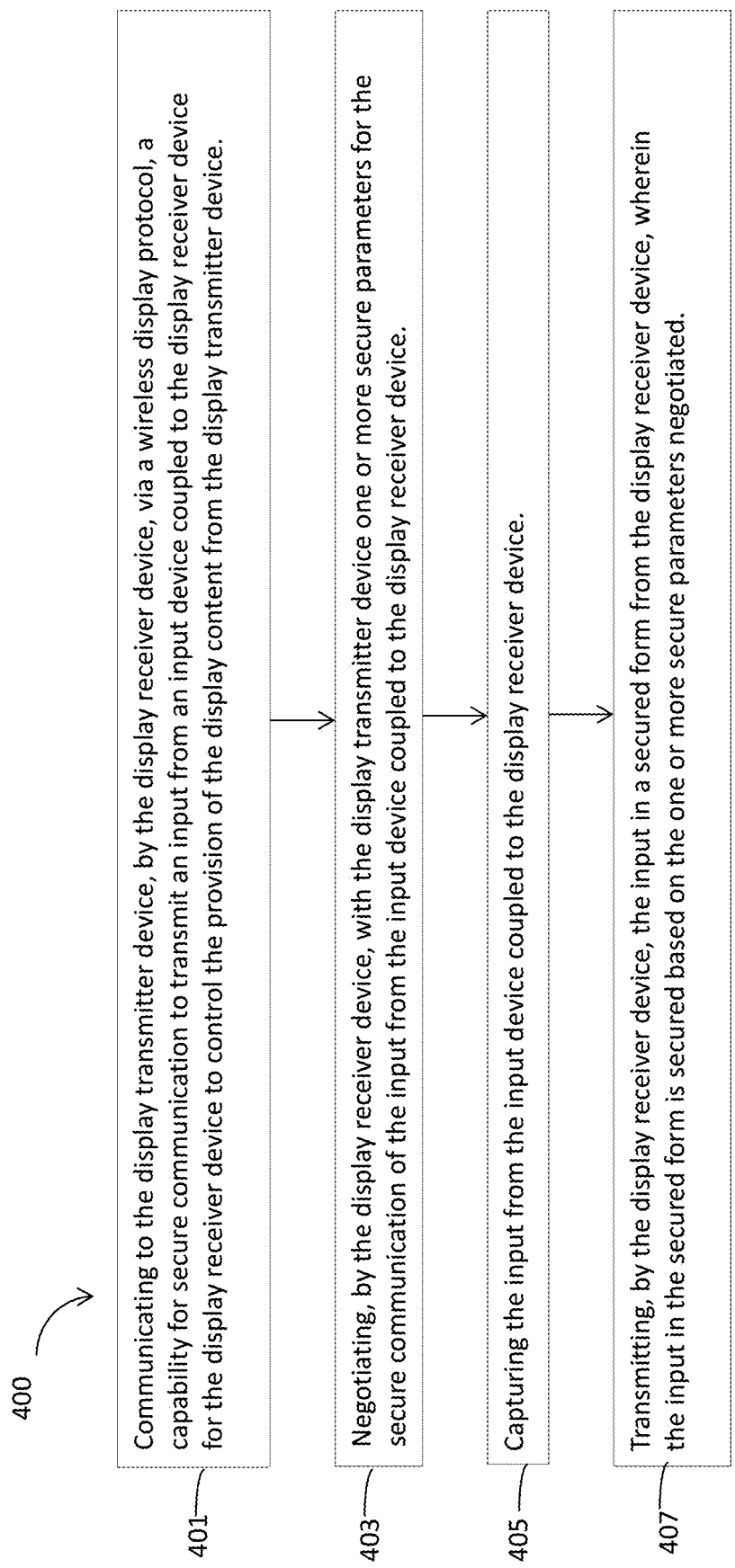
FIG. 4 illustrates an example process for a display receiver device to transmit through a secure back channel an input from an input device coupled to the display receiver device, in accordance with various embodiments.

FIG. 4 illustrates an example process 400 for a display receiver device to transmit an input through a secure back channel from an input device coupled to the display receiver device, in accordance with various embodiments. In embodiments, the process 400 may be a process performed by the display receiver device 130 in FIG. 1, or the display receiver device 230 in FIG. 2, and performed by the display communication interface manager 233.

The process 400 may start at an interaction 401. During the interaction 401, the display receiver device may communicate to the display transmitter device, via a wireless display protocol, a capability for secure communication to transmit an input from an input device coupled to the display receiver device for the display receiver device to control the provision of the display content from the display transmitter device, as described more fully below in FIG. 6. For example, at the interaction 401, the display receiver device 230 may communicate to the display transmitter device 210, via a wireless display protocol, a capability for secure communication to transmit an input from the input device 240 coupled to the display receiver device 230.

During an interaction 403, the display receiver device may negotiate with the display transmitter device one or more secure parameters for the secure communication of the input from the input device coupled to the display receiver device, as described more fully below in FIG. 6. For example, at the interaction 403, the display receiver device 230 may negotiate with the display transmitter device 210 one or more secure parameters for the secure communication of the input from the input device 240 coupled to the display receiver device 230.

During an interaction 405, the display receiver device may capture the input from the input device coupled to the display receiver device. For example, at the interaction 405, the display receiver device 230 may capture the input from the input device 240 coupled to the display receiver device 230, as described more fully below in FIG. 6.

During an interaction 407, the display receiver device may transmit the input in a secured form from the display receiver device, wherein the input in the secured form may be secured based on the one or more secure parameters negotiated, as described more fully below in FIG. 6. For example, at the interaction 407, the display receiver device 230 may transmit the input in a secured form from the display receiver device 230, wherein the input in the secured form may be secured based on the one or more secure parameters negotiated.

Figure 5:
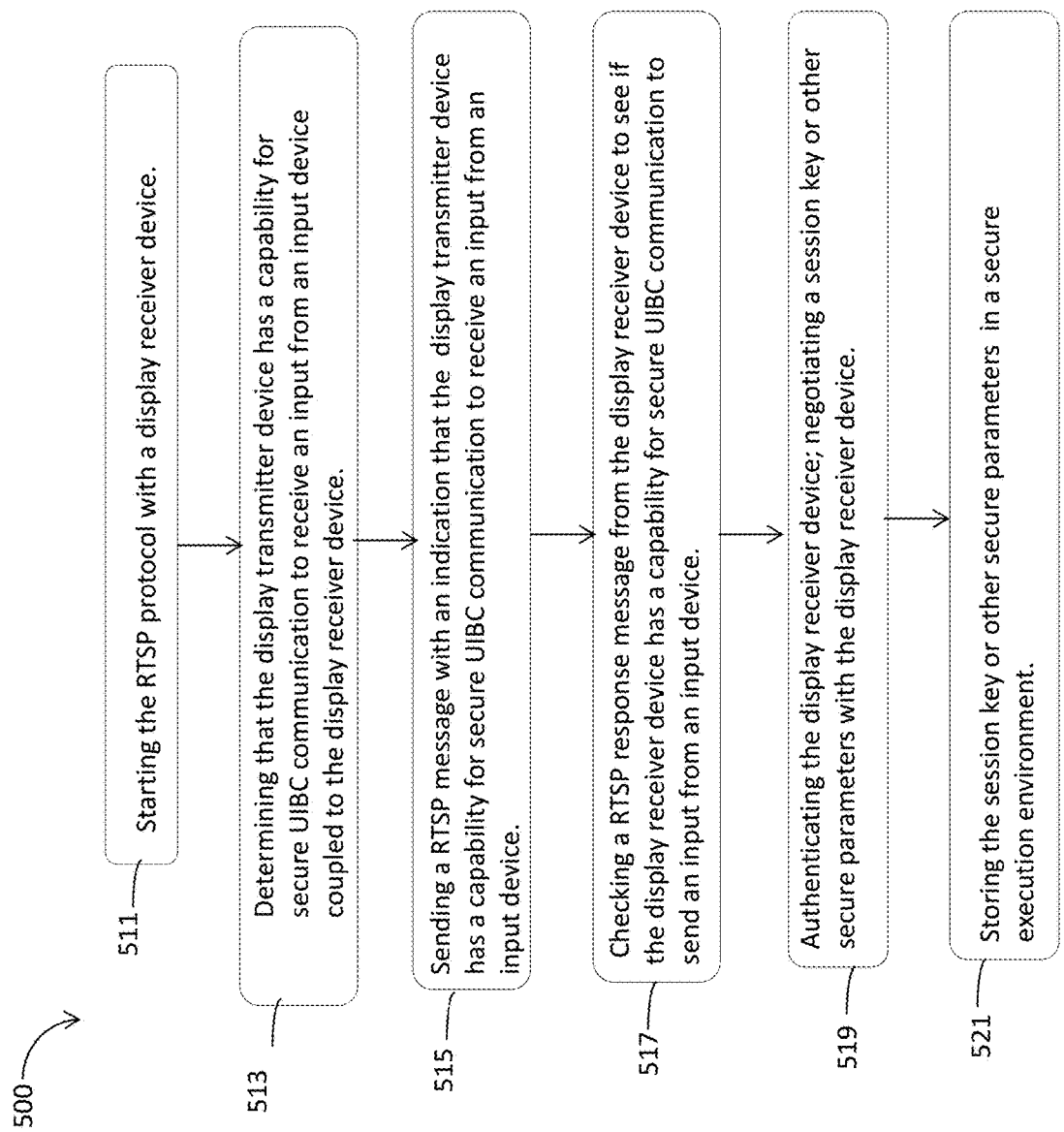
FIG. 5 illustrates another example process for a display transmitter device to receive an input through a secure back channel from an input device coupled to a display receiver device, in accordance with various embodiments.

FIG. 5 illustrates another example process 500 for a display transmitter device to receive an input from an input device coupled to a display receiver device through a secure back channel, in accordance with various embodiments. In embodiments, the process 500 may be a process performed by the display transmitter device 110 in FIG. 1, or the display transmitter device 210 in FIG. 2, and performed by the display communication interface manager 213. The process 500 may be an example of the process 300 shown in FIG. 3, with some additional details when applied to a specific wireless display protocol Miracast.

Miracast is a standard for wireless connections, including both the forward channel and the back channel, between display transmitter devices, such as laptops, tablets, or smartphones, and display receiver devices, such as TVs, monitors, or projectors in a wireless display system. Devices that are Miracast-certified may communicate with each other, regardless of manufacturer. Miracast employs a peer-to-peer Wi-Fi direct standard, and may allow sending up to 1080p high-definition (HD) video (H.264 codec) and 5.1 surround sound. IPv4 may be used on the Internet layer, and transmission control protocol (TCP) or user datagram protocol (UDP) may be used for the transport layer. On the application layer, the communication between a display transmitter device and a display receiver device may be initiated and controlled via real time streaming protocol (RTSP) or real-time transport protocol (RTP). In more detail, the RTSP protocol is an application layer protocol designed for use in entertainment and communications systems to control a streaming media server, e.g., a display transmitter device. The RTSP protocol may be used for establishing and controlling media sessions between end points, e.g., a display transmitter device and a display receiver device. Clients, e.g., display receiver devices, of media servers, e.g., display transmitter devices, may provide inputs to issue VCR-style commands, such as play, record and pause, to facilitate real-time control of the media streaming from the server, e.g., a display transmitter device, to a client, e.g., a display receiver device, or from a client to the server, e.g. in voice recording.

When a display transmitter device and a display receiver device communicate according to Miracast standard, the display transmitter device and the display receiver device may perform device discovery to discover each other prior to connection setup. Afterwards, the display transmitter device and the display receiver device may select a protocol, e.g., Wi-Fi direct or tunneled direct link setup (TDLS), to setup a connection between them. Upon the establishment of connectivity between the display transmitter device and the display receiver device, the display transmitter device may initiate a TCP connection, with a control port using RTSP to create and manage the sessions between the display transmitter device and the display receiver device. Furthermore, the display transmitter device and the display receiver device may negotiate and determine the parameters for the Miracast session.

A UIBC channel may be set up for transmitting user inputs from an input device coupled to the display receiver device to control the provision of display content from the display transmitter device. Two user input categories may be available, i.e., human interface device class (HIDC) and generic. In the current form, a UIBC channel may not be secure, and the display transmitter device may receive the input on the UIBC channel in good faith from the display receiver device, without verifying that the input is from a valid or trusted source. Unsecure UIBC channel may bring many potential security risks, such as interception of the user input, DOS attack to the display transmitter device, or other security risks. The process 300 illustrated in FIG. 3 and the process 400 illustrated in FIG. 4 may be applied to extend Miracast in its current form and establish a secure UIBC channel between a display receiver device and a display transmitter device. The application of the process 300 to extend Miracast standard for a display transmitter device is shown as the process 500 in FIG. 5. Similarly, the application of the process 400 to extend Miracast standard for a display receiver device is shown as the process 600 in FIG. 6.

The process 500 may start at an interaction 511. During the interaction 511, the display transmitter device may start the RTSP protocol with a display receiver device. For example, at the interaction 511, the display transmitter device 210 may communicate to the display receiver device 230 using the RTSP protocol. The interaction 511 may be performed after the display transmitter device 210 and the display receiver device 230 have performed device discovery according to Miracast standard.

During an interaction 513, the display transmitter device may undertake to determine that the display transmitter device has a capability for secure UIBC communication to receive an input from an input device coupled to the display receiver device. Such a capability for secure UIBC communication may be an extension of the normal UIBC that does not prescribe for secure communication. For example, at the interaction 513, the display transmitter device 210 may determine that the display transmitter device 210 itself has a capability for secure UIBC communication to receive an input from the input device 240 coupled to the display receiver device 230. If the display transmitter device 210 determines that it does not have a capability for secure UIBC communication to receive an input, the display transmitter device 210 and the display receiver device 230 may communicate according to normal Miracast standard. On the other hand, when the display transmitter device 210 determines that it has a capability for secure UIBC communication to receive an input, the interaction 513 may be followed by interactions to determine if the display receiver device 230 also has secure UIBC capability. If so, the two devices 210 and 230 may proceed with secure UIBC communications.

During the interaction 515, to determine whether display receiver device 230 also has secure UIBC capability, the display transmitter device may send a RTSP message with an indication that the display transmitter device has a capability for secure UIBC communication to receive an input from an input device. The interaction 515 may be an example of the interaction 301 of the process 300 shown in FIG. 3, and may be applied to the wireless display system 200 in FIG. 2. For example, at the interaction 515, the display transmitter device 210 may send a RTSP message with an indication that the display transmitter device 210 has a capability for secure UIBC communication to receive an input from an input device. Normally, the RTSP protocol may have various kinds of messages, such as M1 message to M9 message. A RTSP M3 message may be used to indicate a list of capabilities a display transmitter device may have. However, a normal list of capabilities in the current RTSP protocol may not include an indication of secure communication capability for the back channel, e.g., a UIBC channel, to receive an input from an input device. In embodiments, a capability for a secure UIBC communication may be added to the normal list of capabilities, and may be transmitted by a RTSP M3 message. For example, a RTSP M3 message may include the following statements to indicate a secure UIBC communication capability for the back channel:

wfd-uibc-protection-
    capability="wfd_uibc_protection_capability:" SP ("none"/uibc-protection-capability) CRLF; "none" indicates no support for the feature.
uibc-protection-data-port="port=" IPPORT SP "protocol=" ("TCP"/"UDP").

During an interaction 517, the display transmitter device may check a RTSP response message from the display receiver device to see if the display receiver device has a capability for secure UIBC communication to send an input from an input device. The interaction 517 may be an example of the interaction 303 of the process 300 shown in FIG. 3, and may be applied to the wireless display system 200 in FIG. 2. For example, at the interaction 517, the display transmitter device 210 may check a RTSP response message from the display receiver device 230 to see if the display receiver device 230 has a capability for secure UIBC communication to send an input from the input device 240. The RTSP response message from the display receiver device 230 may also be a RTSP M3 message and include a secure UIBC communication capability for the back channel when the display receiver device 230 has such a capability.

During an interaction 519, the display transmitter device may authenticate the display receiver device, and further negotiate a session key or other secure parameters with the display receiver device. The interaction 519 may be an example of the interaction 305 and the interaction 307 of the process 300 shown in FIG. 3, and may be applied to the wireless display system 200 in FIG. 2. For example, at the interaction 519, the display transmitter device 210 may authenticate the display receiver device 230, and further negotiate a session key or other secure parameters with the display receiver device 230. The session key may be a high-bandwidth digital content protection (HDCP) session key and may be used for encrypting a UIBC payload by the display receiver device 230 and decrypting the UIBC payload by the display transmitter device 210.

During an interaction 521, the display transmitter device may store the session key or other secure parameters in a secure execution environment. For example, at the interaction 521, the display transmitter device 210 may store the session key or other secure parameters in the secure execution environment 211. The session key or other secure parameters may be used by the display transmitter device 210 to decrypt an UIBC payload, which may be the encrypted input from the input device 240, based on the session key or other secure parameters.

Figure 6:
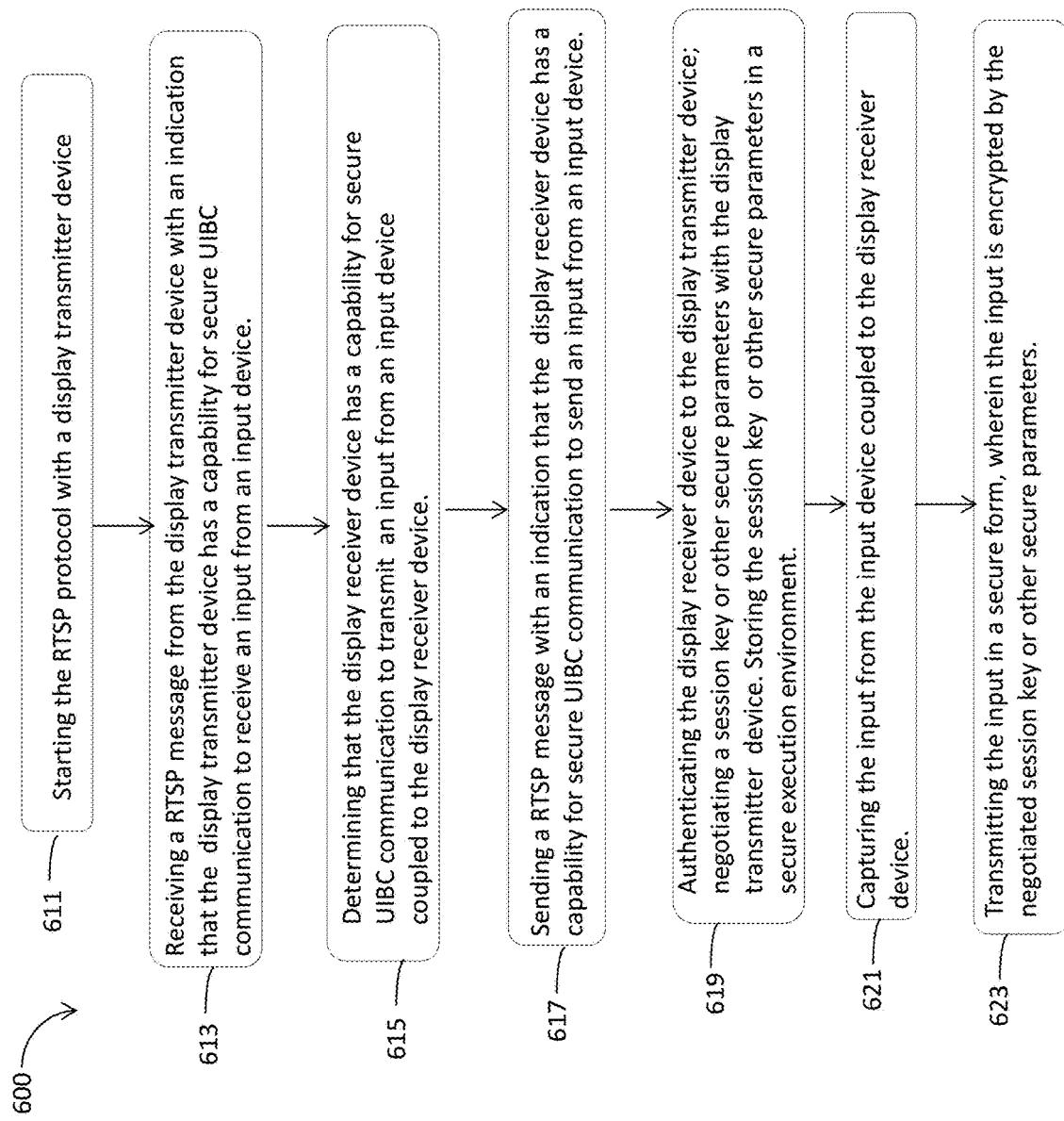
FIG. 6 illustrates another example process for a display receiver device to transmit through a secure back channel an input from an input device coupled to the display receiver device, in accordance with various embodiments.

FIG. 6 illustrates another example process 600 for a display receiver device to transmit an input through a secure back channel from an input device coupled to the display receiver device, in accordance with various embodiments. The process 600 may be an application of the process 400 in FIG. 4 to extend Miracast standard for a display receiver device. In embodiments, the process 600 may be a process performed by the display receiver device 130 in FIG. 1, or the display receiver device 230 in FIG. 2, and performed by the display communication interface manager 233.

The process 600 may start at an interaction 611. During the interaction 611, the display receiver device may start the RTSP protocol with a display transmitter device. For example, at the interaction 611, the display receiver device 230 may communicate to the display transmitter device 210 using the RTSP protocol. The interaction 611 may be performed after the display transmitter device 210 and the display receiver device 230 have performed device discovery according to Miracast standard.

During an interaction 613, the display receiver device may receive a RTSP message from the display transmitter device with an indication that the display transmitter device has a capability for secure UIBC communication to receive an input from an input device. Such a capability for secure UIBC communication may be an extension of the normal UIBC that does not have a secure communication capability. For example, at the interaction 613, the display receiver device 230 may receive a RTSP message from the display transmitter device 210 with an indication that the display transmitter device 210 has a capability for secure UIBC communication to receive an input from an input device.

During an interaction 615, the display receiver device may determine that the display receiver device has a capability for secure UIBC communication to transmit an input from an input device coupled to the display receiver device. For example, at the interaction 615, the display receiver device 230 may determine that the display receiver device 230 has a capability for secure UIBC communication to transmit an input from the input device 240 coupled to the display receiver device 230. If the display receiver device 230 determines that it does not have a capability for secure UIBC communication to transmit an input, the display receiver device 230 and the display transmitter device 210 may communicate according to the normal Miracast standard. On the other hand, when the display receiver device 230 determines that it has a capability for secure UIBC communication to transmit an input, the interaction 615 may be followed by interactions for secure UIBC communications.

During the interaction 617, the display receiver device may send a RTSP message with an indication that the display receiver device has a capability for secure UIBC communication to send an input from an input device. The interaction 617 may be an example of the interaction 401 of the process 400 shown in FIG. 4, and may be applied to the wireless display system 200 in FIG. 2. For example, at the interaction 617, the display receiver device 230 may send a RTSP message, e.g., a RTSP M3 message, with an indication that the display receiver device 230 has a capability for secure UIBC communication to transmit an input from an input device. In embodiments, a capability for a secure UIBC communication may be added to the normal list of capabilities and transmitted by a RTSP M3 message.

During an interaction 619, the display receiver device may authenticate itself to the display transmitter device, negotiate a session key or other secure parameters with the display transmitter device, and store the session key or the other secure parameters in a secure execution environment. The interaction 619 may be an example of the interaction 403 of the process 400 shown in FIG. 4, and may be applied to the wireless display system 200 in FIG. 2. For example, at the interaction 619, the display receiver device 230 may authenticate itself to the display transmitter device 210, negotiate a session key or other secure parameters with the display transmitter device 210, and store the session key or the other secure parameters in the secure execution environment 231. The session key may be a HDCP session key and may be used for encrypting a UIBC payload by the display receiver device 230 and decrypting the UIBC payload by the display transmitter device 210.

During an interaction 621, the display receiver device may capture the input from the input device coupled to the display receiver device. The interaction 621 may be an example of the interaction 405 of the process 400 shown in FIG. 4, and may be applied to the wireless display system 200 in FIG. 2. For example, at the interaction 621, the display receiver device 230 may capture an input from the input device 240 by the secure execution environment 231.

During an interaction 623, the display receiver device may transmit the input in a secure form, wherein the input is encrypted by the negotiated session key or other secure parameters. The interaction 623 may be an example of the interaction 407 of the process 400 shown in FIG. 4, and may be applied to the wireless display system 200 in FIG. 2. For example, at the interaction 623, the display receiver device 230 may encrypt the input from the input device 240 using the negotiated session key, or other secure parameters such as an encryption algorithm. The display receiver device 230 may further pass the encrypted input to the UIBC protocol as payload to be transmitted on the UIBC channel. Furthermore, the display receiver device 230 may add the UIBC headers and send the UIBC payload with the UIBC headers to the display transmitter device 210 through the UIBC channel.

Figure 7:
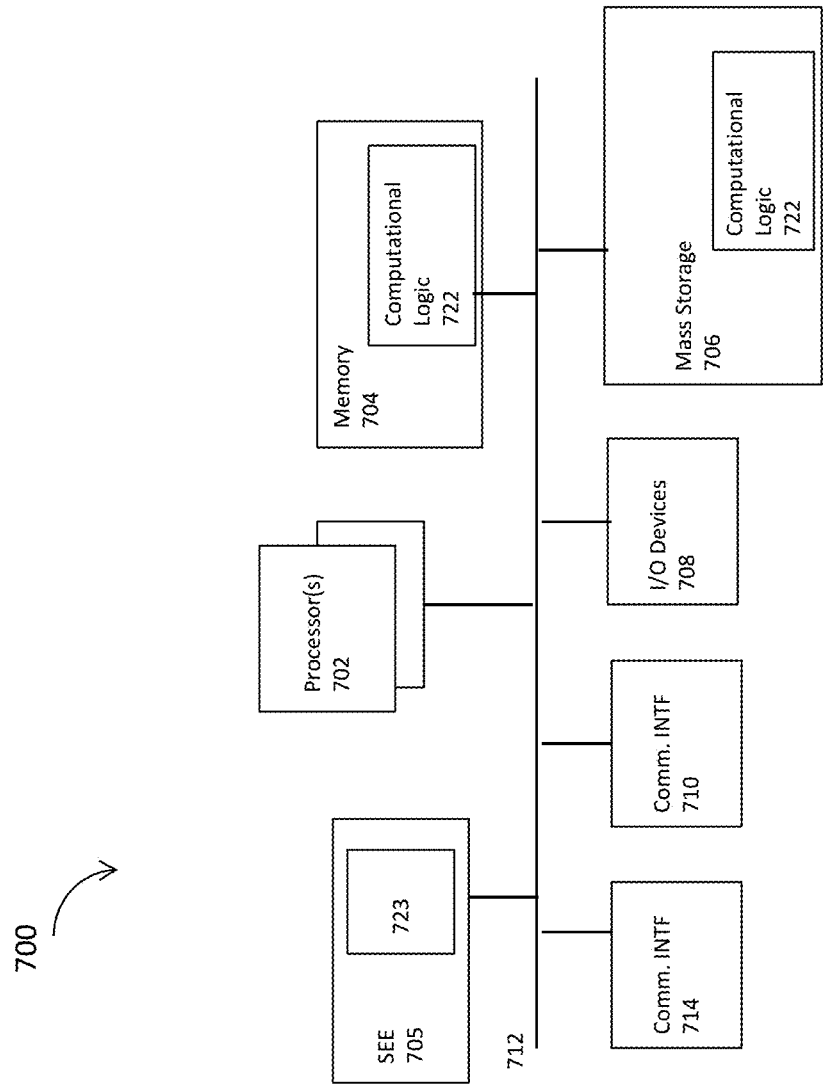
FIG. 7 illustrates an example device suitable for use to practice various aspects of the present disclosure, in accordance with various embodiments.

FIG. 7 illustrates an example communication device 700 that may be suitable as a device to practice selected aspects of the present disclosure. As shown, the device 700 may include one or more processors 702, each having one or more processor cores. The device 700 may be an example of the display transmitter device 110, the display transmitter device 120, or the display receiver device 130 as shown in FIG. 1, the display transmitter device 210, or the display receiver device 230 as shown in FIG. 2. Additionally, the device 700 may include a memory 704, which may be any one of a number of known persistent storage medium. Furthermore, the device 700 may include communication interfaces 710 and 714. Communication interfaces 710 and 714 may be any one of a number of known communication interfaces. The elements may be coupled to each other via system bus 712, which may represent one or more buses. In the case of multiple buses, they may be bridged by one or more bus bridges (not shown). In addition, the device 700 may include a secure execution environment 705, which may be an example of the secure execution environment 211, or the secure execution environment 231 as shown in FIG. 2. The secure execution environment 705 may further include a display communication interface manager 723, which may be an example of the display communication interface manager 213, or the display communication interface manager 233 as shown in FIG. 2.

Each of these elements may perform its conventional functions known in the art. In particular, system memory 704 may be employed to store a working copy and a permanent copy of the programming instructions implementing the operations associated with providing a secure back channel in a wireless display systems, as described in connection with FIGS. 1-6, and/or other functions, collectively referred to as computational logic 722 that provides the capability of the embodiments described in the current disclosure. The various elements may be implemented by assembler instructions supported by processor(s) 702 or high-level languages, such as, for example, C, that can be compiled into such instructions.

The number, capability and/or capacity of these elements 702-714 may vary, depending on the number of other devices the device 700 is configured to support. Otherwise, the constitutions of elements 702-714 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 8:
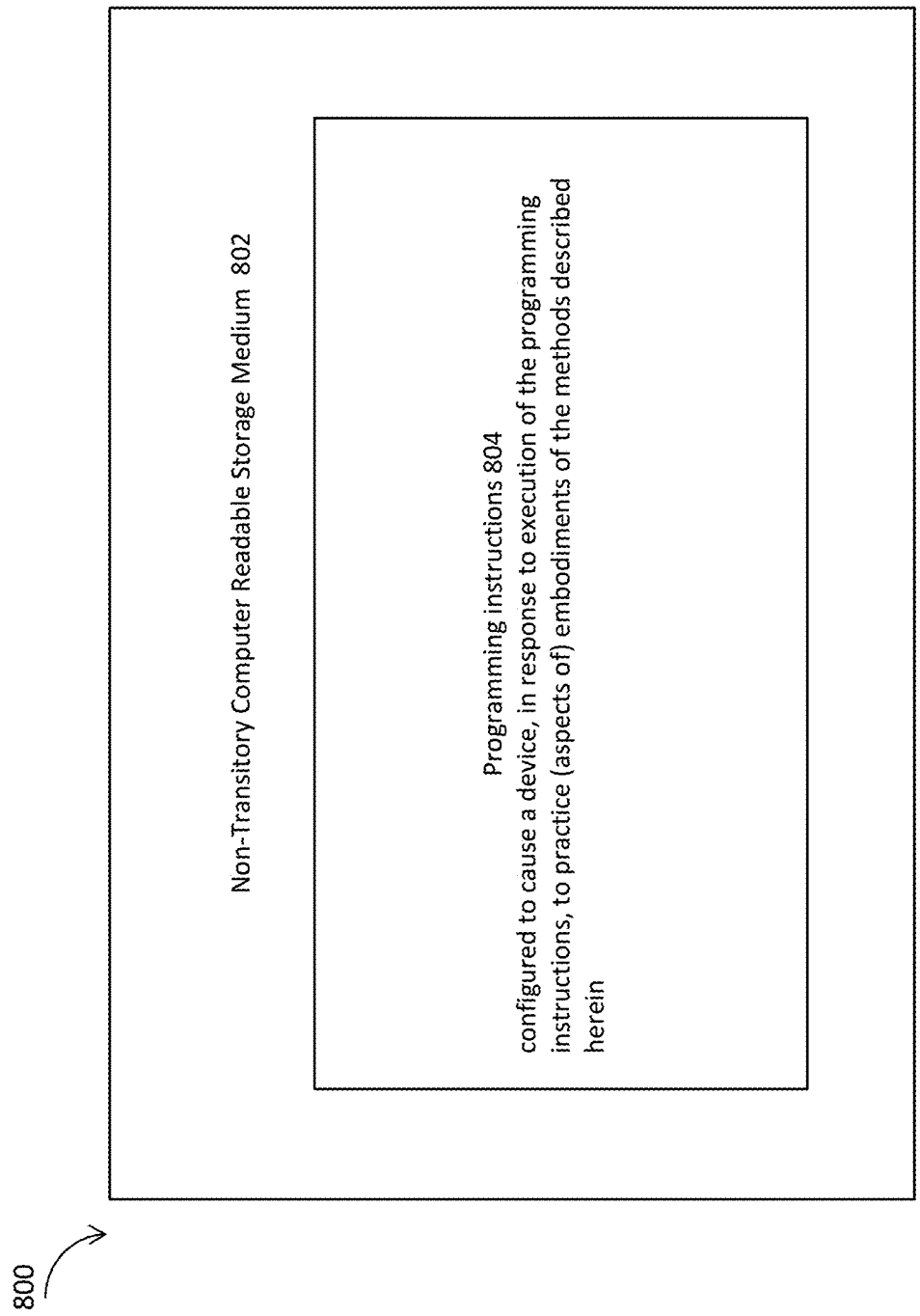
FIG. 8 illustrates a storage medium having instructions for practicing methods described with references to FIGS. 1-7, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a device, e.g., device 700, in response to execution of the programming instructions, to perform, e.g., various operations associated with the display transmitter device 110, the display transmitter device 120, or the display receiver device 130 as shown in FIG. 1, the display transmitter device 210, or the display receiver device 230 as shown in FIG. 2.

In alternate embodiments, programming instructions 804 may be disposed on multiple computer-readable non-transitory storage media 802 instead. In alternate embodiments, programming instructions 804 may be disposed on computer-readable transitory storage media 802, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a display transmitter device for wireless provision of display content to a display receiver device, comprising: a secure execution environment; and a display communication interface manager within the secure execution environment to: communicate to the display receiver device, via a wireless display protocol, a capability for secure communication to receive an input from an input device coupled to the display receiver device for the display receiver device to control the provision of the display content from the display transmitter device; determine that the display receiver device has a capability for secure communication to transmit the input from the input device coupled to the display receiver device; authenticate the display receiver device; negotiate with the display receiver device one or more secure parameters for the secure communication of the input from the input device coupled to the display receiver device, wherein the one or more secure parameters are stored in the secure execution environment; and receive the input in a secured form from the display receiver device, wherein the input in the secured form is secured based on the one or more secure parameters negotiated.

Example 2 may include the display transmitter device of example 1 and/or some other examples herein, wherein the one or more secure parameters include a session key, an encryption algorithm, or a security protocol for transmitting the input in the secured form from the display receiver device to the display transmitter device.

Example 3 may include the display transmitter device of example 1 and/or some other examples herein, wherein the input from the input device coupled to the display receiver device is captured by a secure execution environment in the display receiver device.

Example 4 may include the display transmitter device of example 1 and/or some other examples herein, wherein the display transmitter device is one of a plurality of display transmitter devices to communicate with the display receiver device, or the display receiver device is one of a plurality of display receiver devices to communicate with the display transmitter device.

Example 5 may include the display transmitter device of example 1 and/or some other examples herein, wherein the input device is a selected one of a keyboard, a cursor control device, a pointing stick, a trackball, a camera, a microphone, a touchscreen, or a touchpad.

Example 6 may include the display transmitter device of example 1 and/or some other examples herein, wherein the input device is a selected one of a magnetometer, an accelerometer, a gyroscope, a pressure sensor, a humidity sensor, a proximity sensor, a position sensor, or a temperature sensor.

Example 7 may include the display transmitter device of example 1 and/or some other examples herein, wherein the wireless display protocol is a Miracast protocol or a wireless display (WiDi) protocol.

Example 8 may include the display transmitter device of example 1 and/or some other examples herein, wherein the input in the secured form from the display receiver device is encrypted according to high-bandwidth digital content protection (HDCP) protocol and sent by a user input back channel (UIBC).

Example 9 may include the display transmitter device of any one of examples 1-8 and/or some other examples herein, wherein the display communication interface manager is to further: transmit a multimedia display content to the display receiver device; and decrypt the input in the secured form based on the one or more secure parameters to obtain the input.

Example 10 may include the display transmitter device of any one of examples 1-8 and/or some other examples herein, wherein the display communication interface manager is to further: supply the input to an operating system or an application to operate on the display transmitter device, wherein the application is a banking application or a game.

Example 11 may include a display receiver device for wireless provision of display content from a display transmitter device, comprising: a secure execution environment; and a display communication interface manager within the secure execution environment to: communicate to the display transmitter device, via a wireless display protocol, a capability for secure communication to transmit an input from an input device coupled to the display receiver device for the display receiver device to control the provision of the display content from the display transmitter device; negotiate, with the display transmitter device, one or more secure parameters for the secure communication of the input from the input device coupled to the display receiver device; capture the input from the input device coupled to the display receiver device; and transmit the input in a secured form, wherein the input in the secured form is secured based on the one or more secure parameters negotiated.

Example 12 may include the display receiver device of example 11 and/or some other examples herein, wherein the one or more secure parameters include a session key, an encryption algorithm, or a security protocol for transmitting the input in the secured form from the display receiver device to the display transmitter device.

Example 13 may include the display receiver device of example 11 and/or some other examples herein, wherein the display receiver device is one of a plurality of display receiver devices to communicate with the display transmitter device, or the display transmitter device is one of a plurality of display transmitter devices to communicate with the display receiver device.

Example 14 may include the display receiver device of example 11 and/or some other examples herein, wherein the input device is a selected one of a keyboard, a cursor control device, a pointing stick, a trackball, a camera, a microphone, a touchscreen, a touchpad, a magnetometer, an accelerometer, a gyroscope, a pressure sensor, a humidity sensor, a proximity sensor, a position sensor, or a temperature sensor.

Example 15 may include the display receiver device of example 11 and/or some other examples herein, wherein the wireless display protocol is a Miracast protocol or a wireless display (WiDi) protocol.

Example 16 may include the display receiver device of example 11 and/or some other examples herein, wherein the input in the secured form is encrypted according to high-bandwidth digital content protection (HDCP) protocol and sent by a user input back channel (UIBC).

Example 17 may include the display receiver device of any one of examples 11-16 and/or some other examples herein, wherein the display communication interface manager is to further: receive a multimedia display content from the display transmitter device.

Example 18 may include a wireless display system, comprising: a display transmitter device; a display receiver device; and an input device coupled to the display receiver device; wherein the display transmitter device is to communicate to the display receiver device, via a wireless display protocol, a capability for secure communication to receive an input from the input device, to authenticate the display receiver device, and to negotiate with the display receiver device one or more secure parameters for the secure communication of the input from the input device; and wherein the display receiver device is to negotiate with the display transmitter device the one or more secure parameters, to capture an input from the input device, to transmit the input in a secured form to the display transmitter device, and the input in the secured form is secured based on the one or more secure parameters negotiated.

Example 19 may include the wireless display system of example 18 and/or some other examples herein, wherein the one or more secure parameters include a session key, an encryption algorithm, or a security protocol for transmitting the input in the secured form from the display receiver device to the display transmitter device.

Example 20 may include the wireless display system of example 18 and/or some other examples herein, wherein the input from the input device is captured by a secure execution environment in the display receiver device, and the one or more secure parameters are stored in a secure execution environment in the display receiver device.

Example 21 may include the wireless display system of example 18 and/or some other examples herein, wherein the display transmitter device is one of a plurality of display transmitter devices to communicate with the display receiver device, or the display receiver device is one of a plurality of display receiver devices to communicate with the display transmitter device.

Example 22 may include the wireless display system of example 18 and/or some other examples herein, wherein the input device is a selected one of a keyboard, a cursor control device, a pointing stick, a trackball, a camera, a microphone, a touchscreen, a touchpad, a magnetometer, an accelerometer, a gyroscope, a pressure sensor, a humidity sensor, a proximity sensor, a position sensor, or a temperature sensor.

Example 23 may include the wireless display system of example 18 and/or some other examples herein, wherein the wireless display protocol is a Miracast protocol or a wireless display (WiDi) protocol.

Example 24 may include the wireless display system of any one of examples 18-23 and/or some other examples herein, wherein the display transmitter device is further to: receive the input in the secured form from the display receiver device; and decrypt the input in the secured form based on the one or more secure parameters to obtain the input.

Example 25 may include the wireless display system of any one of examples 18-23 and/or some other examples herein, wherein the display receiver device is further to receive a multimedia display content from the display transmitter device.

Example 26 may include a method for wireless provision of display content from a display transmitter device to be controlled by a display receiver device in a wireless display system, comprising: communicating to the display receiver device, by the display transmitter device, via a wireless display protocol, a capability for secure communication to receive an input from an input device coupled to the display receiver device for the display receiver device to control the provision of the display content from the display transmitter device; determining, by the display transmitter device, that the display receiver device has a capability for secure communication to transmit the input from the input device coupled to the display receiver device; authenticating, by the display transmitter device, the display receiver device; negotiating, by the display transmitter device, with the display receiver device one or more secure parameters for the secure communication of the input from the input device coupled to the display receiver device; and receiving, by the display transmitter device, the input in a secured form from the display receiver device, wherein the input in the secured form is secured based on the one or more secure parameters negotiated.

Example 27 may include the method of example 26 and/or some other examples herein, wherein the one or more secure parameters include a session key, an encryption algorithm, or a security protocol for transmitting the input in the secured form from the display receiver device to the display transmitter device.

Example 28 may include the method of example 26 and/or some other examples herein, wherein the input from the input device coupled to the display receiver device is captured by a secure execution environment in the display receiver device, and the one or more secure parameters are stored in a secure execution environment in the display transmitter device.

Example 29 may include the method of example 26 and/or some other examples herein, wherein the display transmitter device is one of a plurality of display transmitter devices to communicate with the display receiver device, or the display receiver device is one of a plurality of display receiver devices to communicate with the display transmitter device.

Example 30 may include the method of example 26 and/or some other examples herein, wherein the input device is a selected one of a keyboard, a cursor control device, a pointing stick, a trackball, a camera, a microphone, a touchscreen, or a touchpad.

Example 31 may include the method of example 26 and/or some other examples herein, wherein the input device is a selected one of a magnetometer, an accelerometer, a gyroscope, a pressure sensor, a humidity sensor, a proximity sensor, a position sensor, or a temperature sensor.

Example 32 may include the method of example 26 and/or some other examples herein, wherein the wireless display protocol is a Miracast protocol or a wireless display (WiDi) protocol.

Example 33 may include the method of example 26 and/or some other examples herein, wherein the input in the secured form from the display receiver device is encrypted according to high-bandwidth digital content protection (HDCP) protocol and sent by a user input back channel (UIBC).

Example 34 may include the method of any one of examples 26-33 and/or some other examples herein, further comprising: transmitting, by the display transmitter device, a multimedia display content to the display receiver device; and decrypting the input in the secured form based on the one or more secure parameters to obtain the input.

Example 35 may include the method of any one of examples 26-33 and/or some other examples herein, further comprising: supplying the input to an operating system or an application to operate on the display transmitter device, wherein the application is a banking application or a game.

Example 36 may include a method for wireless provision of display content from a display transmitter device to be controlled by a display receiver device in a wireless display system, comprising: communicating to the display transmitter device, by the display receiver device, via a wireless display protocol, a capability for secure communication to transmit an input from an input device coupled to the display receiver device for the display receiver device to control the provision of the display content from the display transmitter device; negotiating, by the display receiver device, with the display transmitter device one or more secure parameters for the secure communication of the input from the input device coupled to the display receiver device; capturing the input from the input device coupled to the display receiver device; transmitting, by the display receiver device, the input in a secured form from the display receiver device, wherein the input in the secured form is secured based on the one or more secure parameters negotiated.

Example 37 may include the method of example 36 and/or some other examples herein, wherein the one or more secure parameters include a session key, an encryption algorithm, or a security protocol for transmitting the input in the secured form from the display receiver device to the display transmitter device.

Example 38 may include the method of example 36 and/or some other examples herein, wherein the capturing the input from the input device includes capturing the input from the input device by a secure execution environment in the display receiver device.

Example 39 may include the method of example 36 and/or some other examples herein, wherein the display receiver device is one of a plurality of display receiver devices to communicate with the display transmitter device, or the display transmitter device is one of a plurality of display transmitter devices to communicate with the display receiver device.

Example 40 may include the method of example 36 and/or some other examples herein, wherein the input device is a selected one of a keyboard, a cursor control device, a pointing stick, a trackball, a camera, a microphone, a touchscreen, a touchpad, a magnetometer, an accelerometer, a gyroscope, a pressure sensor, a humidity sensor, a proximity sensor, a position sensor, or a temperature sensor.

Example 41 may include the method of example 36 and/or some other examples herein, wherein the wireless display protocol is a Miracast protocol, or a wireless display (WiDi) protocol.

Example 42 may include the method of example 36 and/or some other examples herein, wherein the input in the secured form is encrypted according to high-bandwidth digital content protection (HDCP) protocol and sent by a user input back channel (UIBC).

Example 43 may include the method of any one of examples 36-42 and/or some other examples herein, further comprising: receiving a multimedia display content from the display transmitter device.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A display transmitter device for wireless provision of display content to a display receiver device, comprising:
   a secure execution environment; and
   a display communication interface manager within the secure execution environment to:
      communicate to the display receiver device, via a wireless display protocol, a capability for secure communication to receive an input from an input device coupled to the display receiver device for the display receiver device to control the provision of the display content from the display transmitter device;

determine that the display receiver device has a capability for secure communication to transmit the input from the input device to the display transmitter device, wherein the input from the input device is to control operations of the display transmitter device;

authenticate the display receiver device;

negotiate with the display receiver device one or more secure parameters for the secure communication of the input from the input device to the display transmitter device, wherein the one or more secure parameters are stored in the secure execution environment; and receive the input in a secured form from the display receiver device, wherein the input in the secured form is secured based on the one or more secure parameters negotiated.

2. The display transmitter device of claim 1, wherein the one or more secure parameters include a session key, an encryption algorithm, or a security protocol for transmitting the input in the secured form from the display receiver device to the display transmitter device.

3. The display transmitter device of claim 1, wherein the input from the input device coupled to the display receiver device is captured by a secure execution environment in the display receiver device.

4. The display transmitter device of claim 1, wherein the display transmitter device is one of a plurality of display transmitter devices to communicate with the display receiver device, or the display receiver device is one of a plurality of display receiver devices to communicate with the display transmitter device.

5. The display transmitter device of claim 1, wherein the input device is a selected one of a keyboard, a cursor control device, a pointing stick, a trackball, a camera, a microphone, a touchscreen, or a touchpad.

6. The display transmitter device of claim 1, wherein the input device is a selected one of a magnetometer, an accelerometer, a gyroscope, a pressure sensor, a humidity sensor, a proximity sensor, a position sensor, or a temperature sensor.

7. The display transmitter device of claim 1, wherein the wireless display protocol is a Miracast protocol or a wireless display (WiDi) protocol.

8. The display transmitter device of claim 1, wherein the input in the secured form from the display receiver device is encrypted according to high-bandwidth digital content protection (HDCP) protocol and sent by a user input back channel (UIBC).

9. The display transmitter device of claim 1, wherein the display communication interface manager is to further:
transmit a multimedia display content to the display receiver device; and
decrypt the input in the secured form based on the one or more secure parameters to obtain the input.

10. The display transmitter device of claim 1, wherein the display communication interface manager is to further:
supply the input to an operating system or an application to operate on the display transmitter device, wherein the application is a banking application or a game.

11. A display receiver device for wireless provision of display content from a display transmitter device, comprising:

a secure execution environment; and
a display communication interface manager within the secure execution environment to:
communicate to the display transmitter device, via a wireless display protocol, a capability for secure communication to transmit an input from an input device coupled to the display receiver device, wherein the input is to be transmitted to the display transmitter device to control operations of the display transmitter device;
negotiate, with the display transmitter device, one or more secure parameters for the secure communication of the input from the input device coupled to the display receiver device;
capture the input from the input device coupled to the display receiver device; and
transmit the input in a secured form to the display transmitter device, wherein the input in the secured form is secured based on the one or more secure parameters negotiated.

12. The display receiver device of claim 11, wherein the one or more secure parameters include a session key, an encryption algorithm, or a security protocol for transmitting the input in the secured form from the display receiver device to the display transmitter device.

13. The display receiver device of claim 11, wherein the display receiver device is one of a plurality of display receiver devices to communicate with the display transmitter device, or the display transmitter device is one of a plurality of display transmitter devices to communicate with the display receiver device.

14. The display receiver device of claim 11, wherein the input device is a selected one of a keyboard, a cursor control device, a pointing stick, a trackball, a camera, a microphone, a touchscreen, a touchpad, a magnetometer, an accelerometer, a gyroscope, a pressure sensor, a humidity sensor, a proximity sensor, a position sensor, or a temperature sensor.

15. The display receiver device of claim 11, wherein the wireless display protocol is a Miracast protocol or a wireless display (WiDi) protocol.

16. The display receiver device of claim 11, wherein the input in the secured form is encrypted according to high-bandwidth digital content protection (HDCP) protocol and sent by a user input back channel (UIBC).

17. The display receiver device of claim 11, wherein the display communication interface manager is to further:
receive a multimedia display content from the display transmitter device.

18. A wireless display system, comprising:
a display transmitter device;
a display receiver device; and
an input device coupled to the display receiver device;
wherein the display transmitter device is to communicate to the display receiver device, via a wireless display protocol, a capability for secure communication to receive an input from the input device to control operations of the display transmitter device, to authenticate the display receiver device, and to negotiate with the display receiver device one or more secure parameters for the secure communication of the input from the input device; and
wherein the display receiver device is to negotiate with the display transmitter device the one or more secure parameters, to capture an input from the input device, to transmit the input in a secured form to the display transmitter device to control operations of the display transmitter device, and the input in the secured form is secured based on the one or more secure parameters negotiated.

19. The wireless display system of claim 18, wherein the one or more secure parameters include a session key, an encryption algorithm, or a security protocol for transmitting the input in the secured form from the display receiver device to the display transmitter device.

20. The wireless display system of claim 18, wherein the input from the input device is captured by a secure execution environment in the display receiver device, and the one or more secure parameters are stored in a secure execution environment in the display receiver device.

21. The wireless display system of claim 18, wherein the display transmitter device is one of a plurality of display transmitter devices to communicate with the display receiver device, or the display receiver device is one of a plurality of display receiver devices to communicate with the display transmitter device.

22. The wireless display system of claim 18, wherein the input device is a selected one of a keyboard, a cursor control device, a pointing stick, a trackball, a camera, a microphone, a touchscreen, a touchpad, a magnetometer, an accelerometer, a gyroscope, a pressure sensor, a humidity sensor, a proximity sensor, a position sensor, or a temperature sensor.

23. The wireless display system of claim 18, wherein the wireless display protocol is a Miracast protocol or a wireless display (WiDi) protocol.

24. The wireless display system of claim 18, wherein the display transmitter device is further to:
  receive the input in the secured form from the display receiver device; and
  decrypt the input in the secured form based on the one or more secure parameters to obtain the input.

25. The wireless display system of claim 18, wherein the display receiver device is further to receive a multimedia display content from the display transmitter device.

* * * * *